United States Patent
Jun et al.

(10) Patent No.: US 7,755,242 B2
(45) Date of Patent: Jul. 13, 2010

(54) MOTOR, METHOD FOR MANUFACTURING THE SAME, AND WASHING MACHINE USING THE SAME

(75) Inventors: Cha Seung Jun, Seoul (KR); Byoung Wook Min, Seoul (KR)

(73) Assignee: LG Electronics Inc., Seoul (KR)

( * ) Notice: Subject to any disclaimer, the term of this patent is extended or adjusted under 35 U.S.C. 154(b) by 367 days.

(21) Appl. No.: 11/606,963

(22) Filed: Dec. 1, 2006

(65) Prior Publication Data
US 2007/0126309 A1 Jun. 7, 2007

(30) Foreign Application Priority Data

Dec. 5, 2005 (KR) ............... 10-2005-0117446
Dec. 5, 2005 (KR) ............... 10-2005-0117447

(51) Int. Cl.
*H02K 1/06* (2006.01)
(52) U.S. Cl. ............... 310/186; 310/185; 310/187; 310/257
(58) Field of Classification Search .......... 310/216, 310/214, 67 R, 257, 185, 186, 187; 963/216
See application file for complete search history.

(56) References Cited

U.S. PATENT DOCUMENTS

| | | | |
|---|---|---|---|
| 3,035,195 A * | 5/1962 | Welter et al. ............ 310/214 |
| 3,495,113 A * | 2/1970 | Haydon .................. 310/164 |
| 4,190,794 A * | 2/1980 | Mikulic .................. 318/831 |
| 5,767,598 A * | 6/1998 | Kano et al. ............... 310/91 |
| 5,939,811 A * | 8/1999 | Enomoto et al. .......... 310/216 |
| 6,262,509 B1 * | 7/2001 | Safavi et al. ............. 310/216 |
| 6,384,505 B1 * | 5/2002 | Horng et al. ............. 310/186 |
| 6,441,531 B1 * | 8/2002 | Horng et al. ............. 310/216 |
| 6,707,191 B1 * | 3/2004 | Bye ..................... 310/75 A |
| 2001/0022482 A1 * | 9/2001 | Leyvraz et al. ........... 310/254 |
| 2004/0251765 A1 * | 12/2004 | Dooley et al. ............ 310/214 |
| 2005/0023913 A1 * | 2/2005 | Fisher et al. .............. 310/89 |
| 2005/0189838 A1 * | 9/2005 | Lee ...................... 310/217 |
| 2005/0194858 A1 * | 9/2005 | Ahn ..................... 310/216 |

* cited by examiner

*Primary Examiner*—Quyen Leung
*Assistant Examiner*—Terrance Kenerly
(74) *Attorney, Agent, or Firm*—McKenna Long & Aldridge LLP

(57) ABSTRACT

A motor having a structure configured to reduce magnetic resistance between a rotor and a stator, a method for manufacturing the motor, and a washing machine using the motor are disclosed. The motor includes a rotor, and a stator co-operating with the rotor. The stator includes a main core and an auxiliary core. The main core includes a base and a plurality of teeth protruding from the base. The auxiliary core is structured to prevent the occurrence of magnetic resistance from being generated from spaces, defined between adjacent teeth, when the stator co-operates with the rotor.

11 Claims, 11 Drawing Sheets

MOTOR, METHOD FOR MANUFACTURING THE SAME, AND WASHING MACHINE USING THE SAME

This application claims the benefit of Korean Patent Application Nos. 10-2005-0117446 and 10-2005-0117447, both filed on Dec. 5, 2005, which are hereby incorporated by reference as if fully set forth herein.

BACKGROUND OF THE INVENTION

1. Field of the Invention

The present invention relates to machinery, and more particularly, to a motor having a structure capable of reducing generation of a magnetic resistance between a rotor and a stator, a method for manufacturing the motor, and a washing machine using the motor.

2. Discussion of the Related Art

Generally, a motor is a device for changing electrical energy to dynamic energy, and in particular, a device for generating dynamic energy using an electromagnetic force generated when current flows through a conducting wire arranged in an area where a magnetic field is generated.

Such a motor is widely used in machinery requiring motive power. Typically, such a motor is used in washing machines, refrigerators, and other appliances. The following description will be given in conjunction with an example of a drum washing machine using a motor.

Drum washing machines are classified into an indirect connection type in which a drive force from a motor is indirectly transmitted to a drum via a belt wound between a motor pulley and a drum pulley, and a direct connection type in which the rotor of a motor is directly connected to a drum such that a drive force from the motor is directly transmitted to the drum.

In the indirect connection or transmission type, energy loss occurs during power transmission carried out via the motor pulley and drum pulley. Furthermore, it is noisy. For this reason, the use of direct connection type drum washing machines using a brushless DC (BLDC) motor is increasing, in order to solve the above-mentioned problems incurred in direct connection type drum washing machines.

Hereinafter, the structure of a conventional direct connection type drum washing machine will be described in brief with reference to FIG. 1.

FIG. 1 is a vertical sectional view illustrating a configuration of a conventional drum washing machine. As shown in FIG. 1, the drum washing machine includes a cabinet 1, and a tub 2 installed within the cabinet 1. A drum 3 is centrally arranged in the tub 2 such that the drum 3 is rotatable.

A motor is mounted to the tub 2 at the rear of the tub 2. In detail, a stator 60 is fixed to a rear wall of the tub 2. A rotor 5 surrounds the stator 60 while being axially coupled with the drum 3 by a shaft 4 extending through the tub 2.

A door 7 is arranged at the front of the cabinet 1, to open or close the cabinet 1. A gasket 8 is interposed between the door 7 and the tub 2.

A hanging spring 9 is mounted between an inner top surface of the cabinet 1 and an upper portion of the outer circumferential surface of the tub 2, to support the tub 2. A friction damper 10 is also mounted between an inner bottom surface of the cabinet 1 and a lower portion of the outer circumferential surface of the tub 2, to attenuate vibrations generated at the tub 2 during a spin-drying operation.

Meanwhile, as shown in FIG. 2, the stator 60 includes a core 61 constituting a central portion of the stator 60, teeth 63 protruding from the core 61, and coils 65 wound around the teeth 63.

A space S is formed between the adjacent teeth 63, in order to allow the task of winding the coils 65 to be easily carried out. However, this space S reduces the effective torque of the motor.

Specifically, due to the space S, the magnetic resistance generated between the stator 60 and the rotor 5 is increased, thereby causing an increase in cogging torque and an increase in torque ripple. As a result, the effective torque of the motor is reduced, thereby causing a degradation in the performance of the motor. Cogging torque is a torque caused by a variation in magnetic resistance occurring in spaces due to a relative position variation between the rotor and the stator. Since such a cogging torque is not rendered to be an effective motor torque component, it is desired to reduce the cogging torque.

When increases in cogging torque and torque ripple occurs, there is a problem in that the generation of vibrations and noise in the motor is also increased.

In order to eliminate the problems caused by the space S, a proposal has been made, wherein each tooth has a trapezoidal tip 63a. In this case, however, there is a problem of material costs increasing in that the amount of scrap produced in the manufacture of the stator core is increased due to the trapezoidal cross-sectional shape of the tooth tips 63a.

SUMMARY OF THE INVENTION

Accordingly, a motor, a method for manufacturing the same, and a washing machine using the same that substantially obviate one or more problems due to limitations and disadvantages of the related art, are disclosed.

An object of the present invention is to provide a motor having a structure configured to reduce the generation of magnetic resistance between a stator and a rotor, and a washing machine using the motor.

Another object of the present invention is to provide a motor having a configured to reduce the generation of vibrations and noise, and a washing machine using the motor.

Still another object of the present invention is to provide a motor having a structure capable of reducing manufacturing costs, a method for manufacturing the motor, and a washing machine using the motor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a motor comprises a rotor; and a stator co-operating with the rotor, wherein the stator comprises: a main core including a base, and a plurality of teeth protruded from the base; and an auxiliary core for preventing spaces each defined between adjacent ones of the teeth from functioning as a magnetic resistance while the stator co-operates with the rotor.

The auxiliary core may comprise a plate positioned over or beneath the main core, and shields each arranged at an associated one of the spaces.

Each shield may include a first extension extending from the plate, and a second extension extending from the first extension such that the second extension is bent from the first extension to shield the associated space.

The plate may cover an overall upper surface of the main core.

Each second extension may have a groove for adjusting an exposed area of the associated space.

The second extension may have a portion varying in width in a thickness direction of the main core.

The second extension may be arranged outside a circumferential surface of the main core, and has a height larger than a thickness of the main core.

Each tooth may have a portion varying a width in a protrusion direction of the tooth.

The auxiliary core may comprise an upper plate positioned over the main core, upper shields extending from the upper plate, a lower plate positioned beneath the main core, and lower shields extending from the lower plate.

Each upper shield may have an upper groove for adjusting an exposed area of an associated one of the spaces.

The second extensions may be connected together, to form an integrated ring-shaped structure surrounding a circumferential surface of the main core.

The integrated ring-shaped structure of the second extensions may have a plurality of slots for adjusting an exposed area of the spaces.

Each slot may be arranged between the adjacent teeth.

The motor may further comprise an insulator interposed between a coil wound around each tooth and the main core or between the coils respectively wound around the teeth.

The auxiliary core may be fabricated in accordance with a pressing process.

The auxiliary core may be made of a weak magnetic material.

The motor may further comprise an intermediate member for preventing transmission of vibrations between the auxiliary core and the main core, and insulating the auxiliary core and the main core from each other.

The main core may have a structure having a plurality of layers spirally stacked thickness direction of the main core.

In another aspect of the present invention, a method for manufacturing a motor comprises: fabricating a main core including a base, and a plurality of teeth protruded from the base; winding coils around the teeth, respectively; and installing an auxiliary core, to shield at least a portion of a space defined between adjacent ones of the teeth.

In still another aspect of the present invention, a washing machine comprises: a motor including a stator and a rotor; a central shaft connected to the rotor such that the central shaft is rotated by the motor; and a washing tub connected to the central shaft such that the washing tub is rotated in accordance with the rotation of the central shaft, wherein the stator comprises: a main core including a base, and a plurality of teeth protruded from the base; and an auxiliary core for preventing spaces each defined between adjacent ones of the teeth from functioning as a magnetic resistance to the rotor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to the preferred embodiments of the present invention examples of which are illustrated in the accompanying drawings. Wherever possible, the same reference numbers will be used throughout the drawings to refer to the same or like parts.

Figure 3:
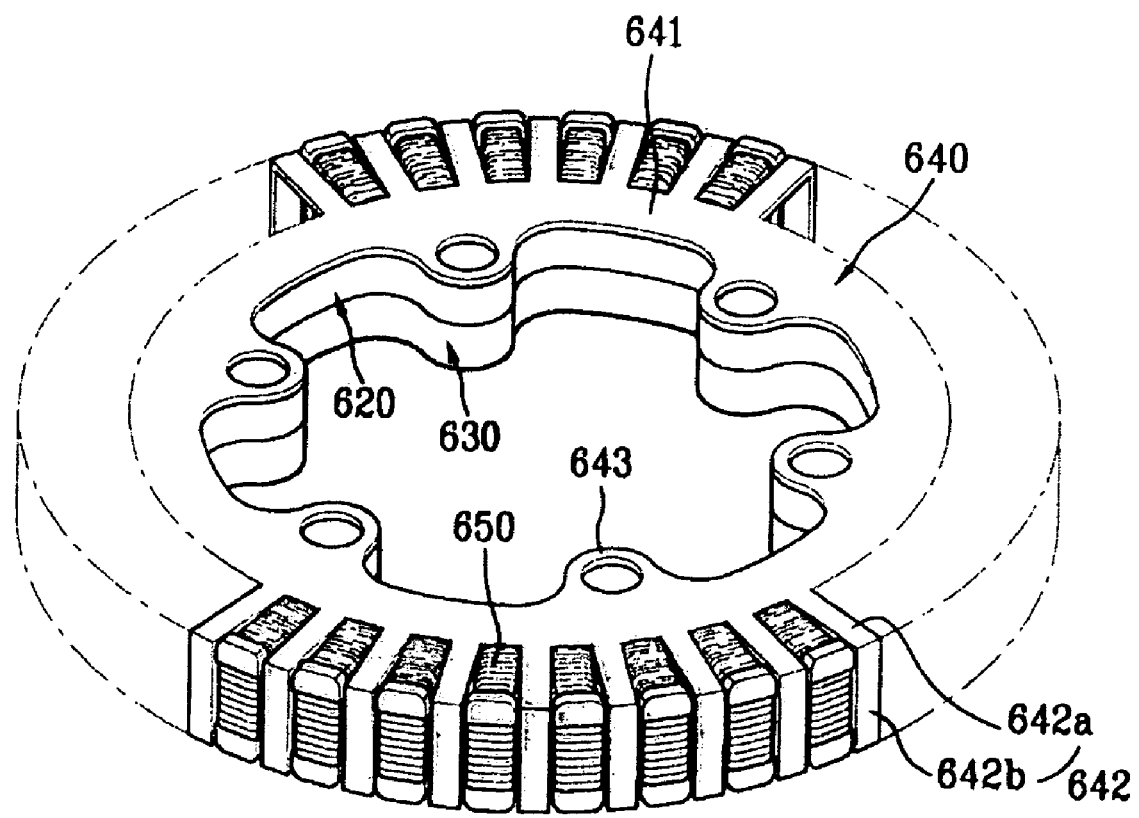
FIG. 3 is a perspective view illustrating a stator included in a motor according to a first embodiment to the present invention.
Figure 4:
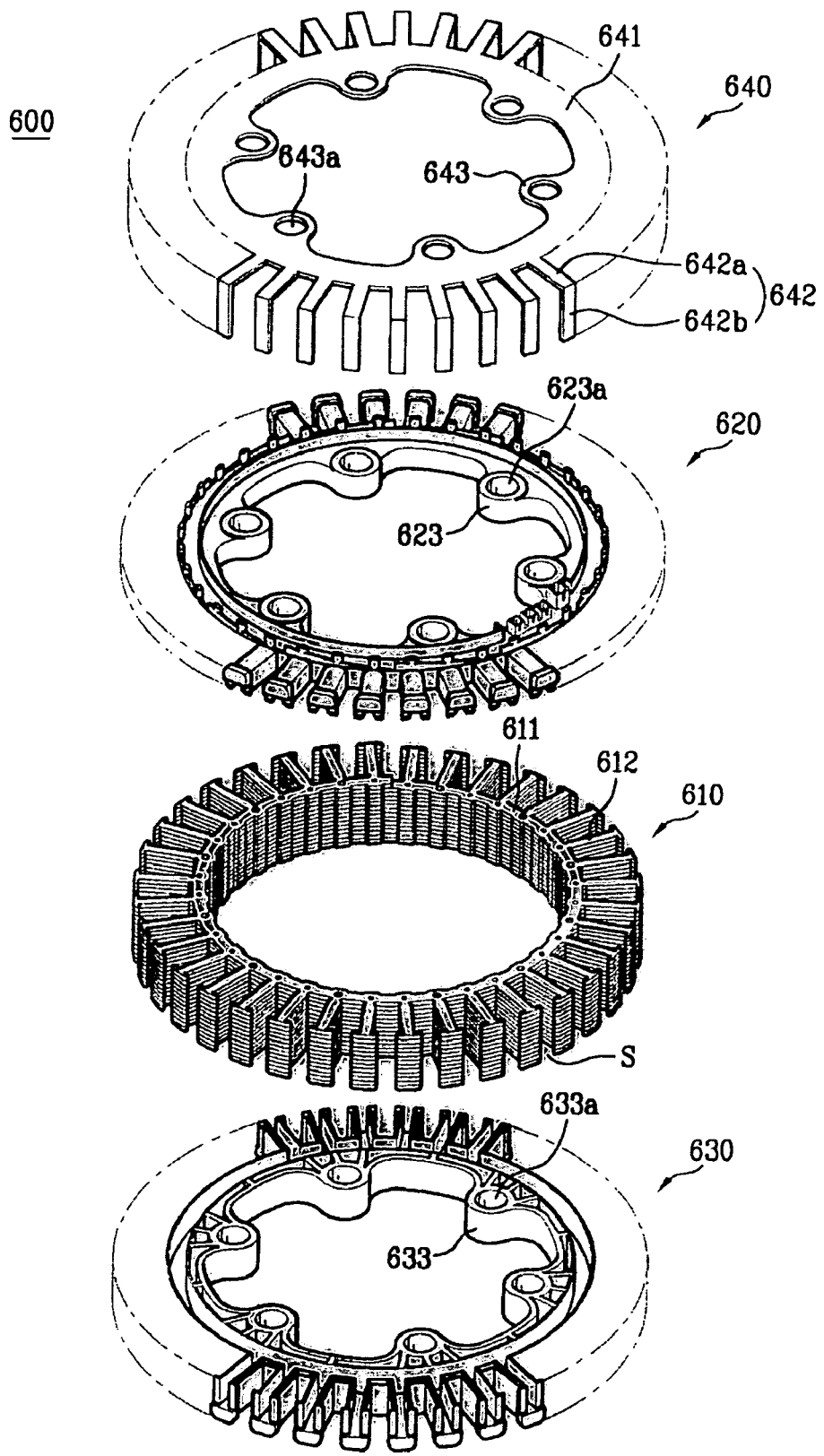
FIG. 4 is an exploded perspective view of the stator shown in FIG. 3.

A description will be given of a motor according to an exemplary embodiment of the present invention with reference to FIGS. 3 and 4.

Figure 1:
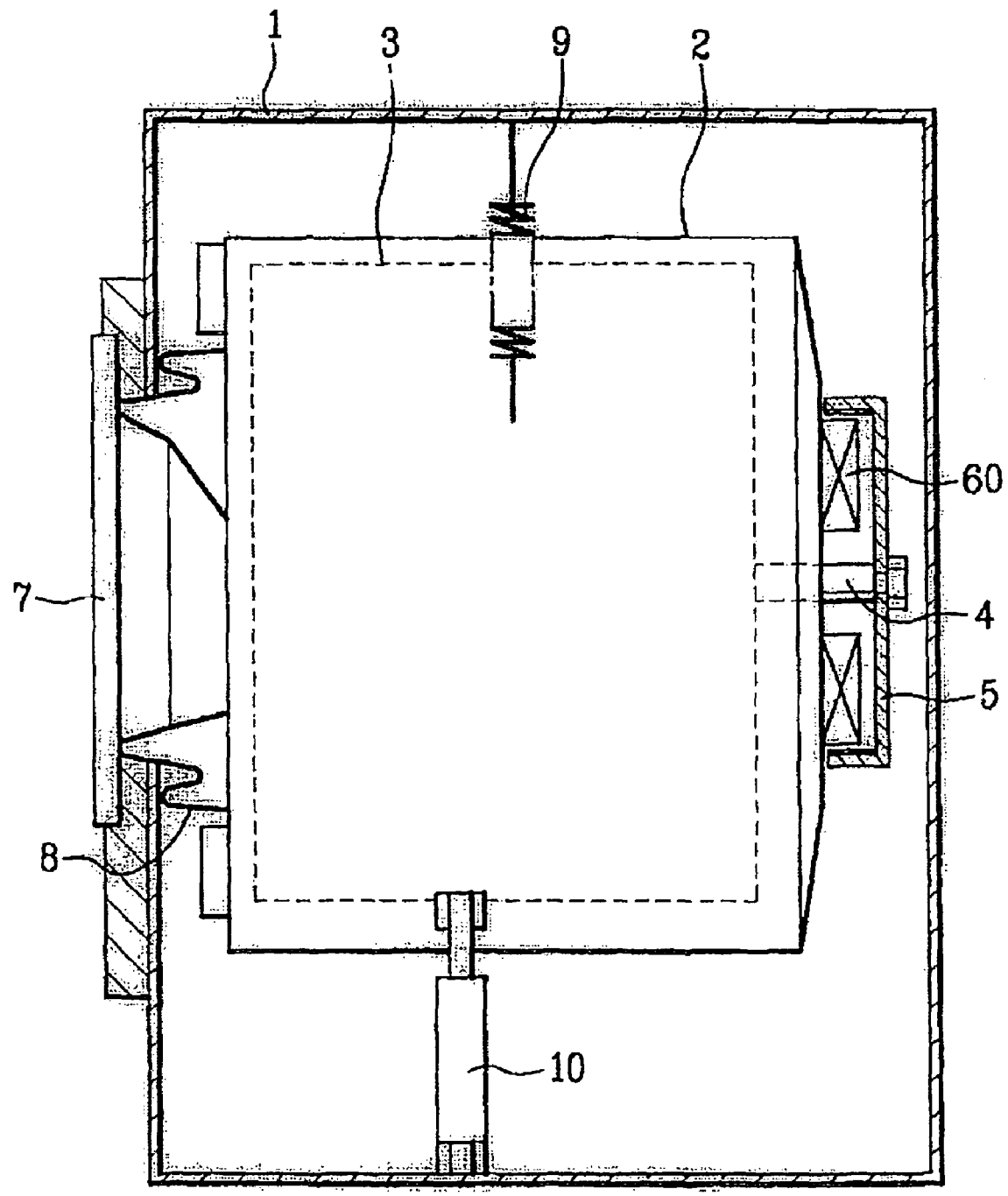
FIG. 1 is a vertical sectional view illustrating a configuration of a conventional drum washing machine.
Figure 2:
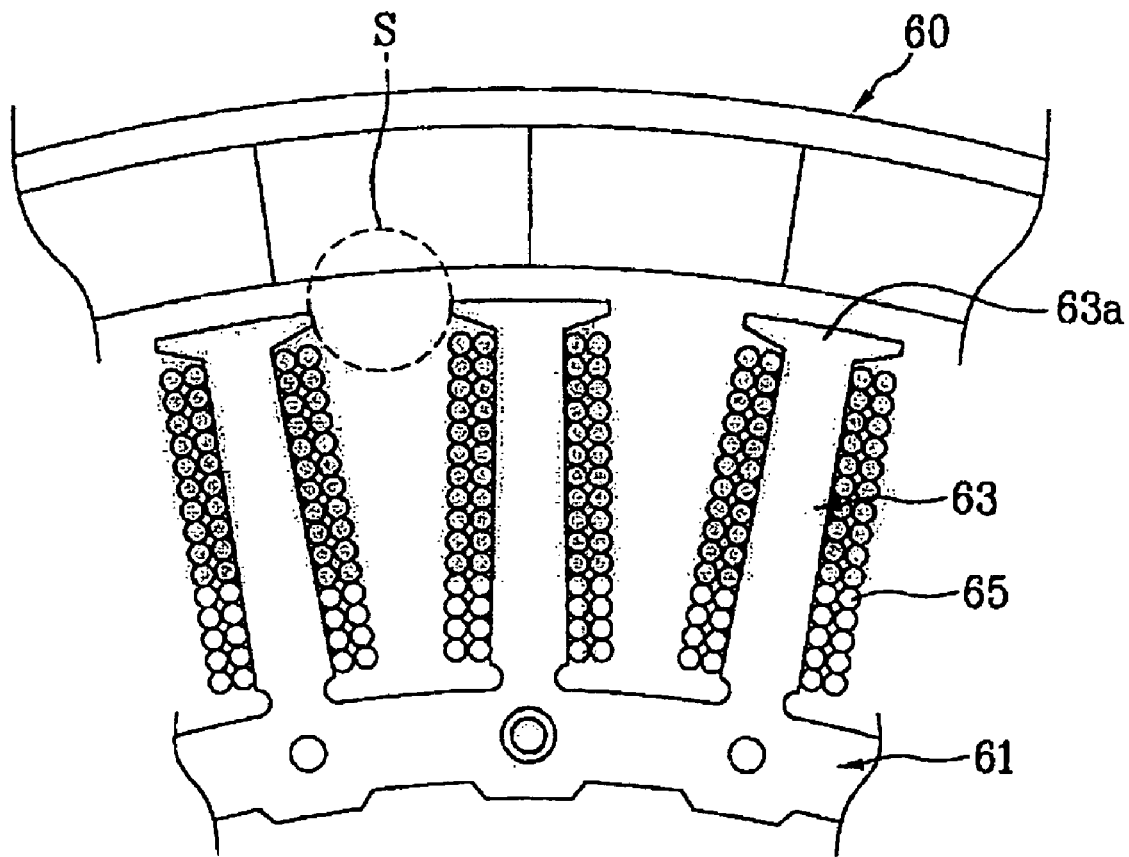
FIG. 2 is a plan view schematically illustrating a stator included in the conventional drum washing machine.

The motor includes a rotor (similar but not limited to the rotor illustrated in FIG. 1), and a stator 600 interacting with the rotor. As shown in FIG. 4, in accordance with a first embodiment of the present invention, the stator 600 includes a main core 610 that includes a base 611 and a plurality of teeth 612 protruded from the base 611 such that a space is formed between the adjacent teeth 612. The stator 600 also includes an auxiliary core 640 for preventing the spaces among the teeth 612 from functioning as a magnetic resistance to the rotor.

The stator 600 may further include insulators 620 and 630 for electrically insulating the main core 610 from coils 650 wound around the teeth 612, and electrically insulating the coils 650 from one another.

The main core 610 is made of a weak magnetic material, and has an annular multi-layer structure. The main core 610 functions to provide magnetic flux paths. The annular multi-layer structure of the main core 610 is formed by preparing an elongated metal strip having a base to form the base 611 of the main core 610, and teeth to form the teeth 612 of the main core 610, and spirally winding the metal strip while stacking the wound portions of the metal strip.

The teeth 612 are protruded toward the rotor, to provide areas around which the coils 650 are wound, respectively. Each tooth 612 may have a portion varying in width in the protrusion direction thereof. Each coil 650 functions to generate a rotating magnetic field when current flows through the coil 650 in accordance with application of a voltage from the outside.

The present invention is not limited to the above-described embodiment. For example, the main core 610 may be fabricated by assembling a plurality of divided cores such that the assembled divided cores form an annular structure. In this case, each divided core is fabricated by pressing a metal plate, to prepare unit cores each having a base, teeth, and protrusion arranged opposite to the teeth, to define an engagement groove, and then stacking the prepared unit cores.

Thereafter, the divided cores are circumferentially interconnected to one another. Thus, an annular main core is formed. In this case, each divided core is formed with engagement grooves and engagement protrusions so that the adjacent divided cores can be coupled with each other.

The insulator 620 is an upper insulator mounted to an upper portion of the main core 610, whereas the insulator 630 is a lower insulator mounted to a lower portion of the main core 610. The upper insulator 620 is arranged to enclose the upper portion of the main core 610, whereas the lower insulator 630 is arranged to enclose the lower portion of the main core 610 while facing the upper insulator 620.

The upper insulator 620 has a plurality of fastening portions 623 each formed with a fastening hole 623a to fasten the stator 600. The lower insulator 630 has a plurality of fastening portions 633 each formed with a fastening hole 633a to fasten the stator 600. In detail, each of the fastening portions 623 and 633 is integrated (e.g., formed as a single unit) with an associated one of the upper insulator 620 and lower insulator 630 while extending radially from an inner circumferential surface of the associated insulator 620 or 630. The fastening holes 623a, 633a are positioned on the insulators 620, 630 at the fastening portions 623, 633, respectively. Preferably, the fastening portions 623 or 633 extend radially and protrude inwardly from the associated insulator 620 or 630 at three or more insulator positions, respectively.

The auxiliary core 640 is made of a weak magnetic material, and is separate from the main core 610. The auxiliary core 640 is fabricated through a pressing process. The auxiliary core 640 includes a plate 641 positioned over the main core 610, and shields 642 arranged to correspond to the spaces S of the main core 610 such that each shield 642 shields at least a portion of the corresponding space S.

The auxiliary core 640 also includes auxiliary fastening portions 643 formed at an inner circumferential surface of the plate 641 such that the auxiliary fastening portions 643 correspond to the fastening portions 623 and 633 of the insulators 620 and 630. Similarly to the fastening portions 623 and 633, the auxiliary fastening portions 643 have auxiliary fastening holes 643a each corresponding to the fastening hole 623a of the corresponding fastening portion 623 and to the fastening hole 633a of the corresponding fastening portion 633.

Each shield 642 has a curved structure extending from an outer circumferential surface of the plate 641. In detail, each shield 642 includes a horizontal extension 642a extending horizontally from the outer circumferential surface of the plate 641, and a vertical extension 642b extending vertically from the horizontal extension 642a. The vertical extension 642b of each shield 642 is arranged between the associated teeth 612, namely, the associated space S.

Figure 5:
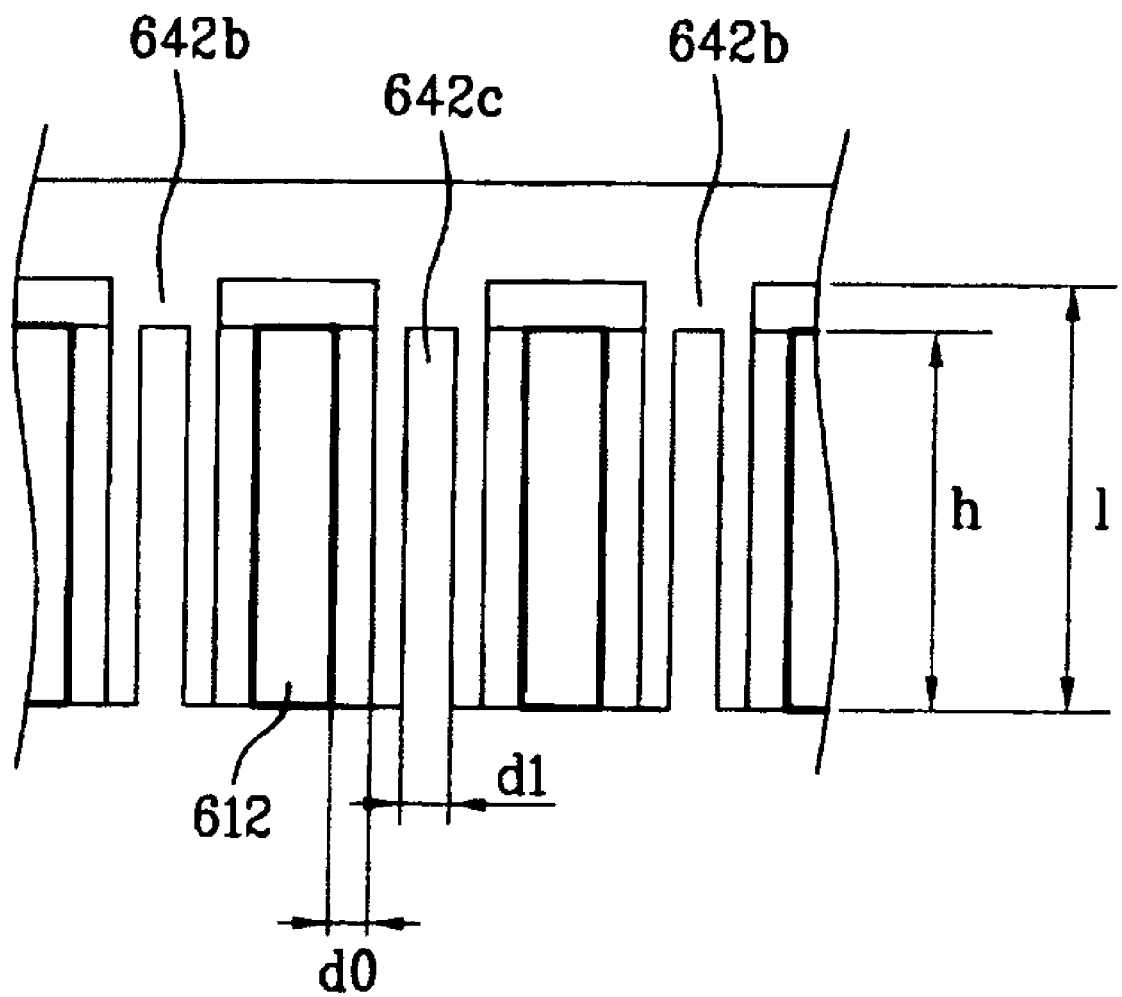
FIG. 5 is a sectional view schematically illustrating an embodiment of a circumferential structure in the stator of FIG. 3.

As shown in FIG. 5, the vertical extension 642b of each shield 642 may be formed with a groove 642c adapted to adjust an exposed area of the associated space S. In detail, the groove 642c may extend to a certain length in a stacking direction, namely, a thickness direction, of the main core 610.

When the groove 642c has a width d1 corresponding to 0.5 to 1.5 times the distance d0 between the vertical extension 642b of the auxiliary core 640 and the tooth 612 of the main core 610 arranged adjacent to the vertical extension 642b, it is possible to maximize the effective torque of the motor while minimizing generation of a cogging torque in the motor.

The vertical extension 642b of each shield 642 has a constant width in the stacking direction of the main core 610. Of course, the vertical extension 642b may have a portion varying in width in the stacking direction of the main core 610.

Figure 6:
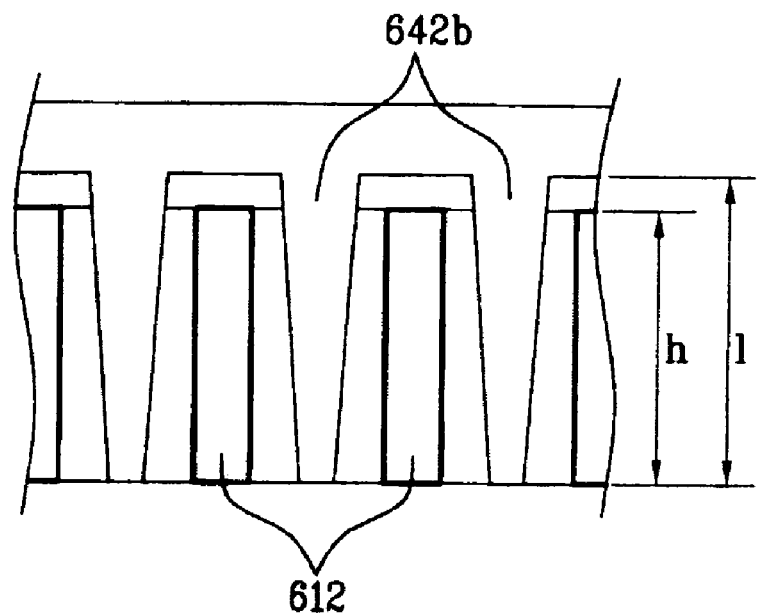
FIG. 6 is a sectional view schematically illustrating another embodiment of the circumferential structure in the stator of FIG. 3.

In detail, as shown in FIG. 6, the width of the vertical extension 642b may linearly vary in the stacking direction of the main core 610. That is, the vertical extension 642b has a width gradually reduced (e.g., a tapering form), as it extends downwardly in the stacking direction of the main core 610.

Figure 7:
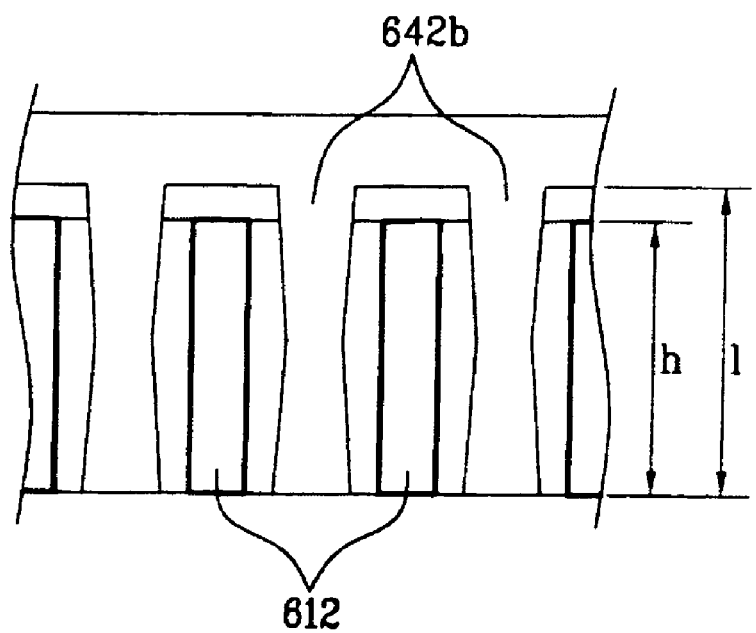
FIG. 7 is a sectional view schematically illustrating another embodiment of the circumferential structure in the stator of FIG. 3.

Alternatively, as shown in FIG. 7, the vertical extension 642b may have a width gradually reduced, and then gradually increased as it extends downwardly in the stacking direction of the main core 610.

As the exposed area of the space S between the adjacent teeth 612 in the circumferential direction of the main core 610 is adjusted by a variation in the shape of the associated vertical extension 642b, it is possible to effectively reduce the cogging torque and torque ripple of the motor.

Meanwhile, it is desirable that the length l of the vertical extension 642b is larger than the stacking height h, namely, thickness, of the main core 610, irrespective of whether the width of the vertical extension 642b is constant or varies linearly or non-linearly, as shown in FIG. 5, 6 or 7.

The reason of this design is to effectively shield the space between the adjacent teeth 612, and thus, to reduce the cogging torque and torque ripple of the motor.

Figure 8:
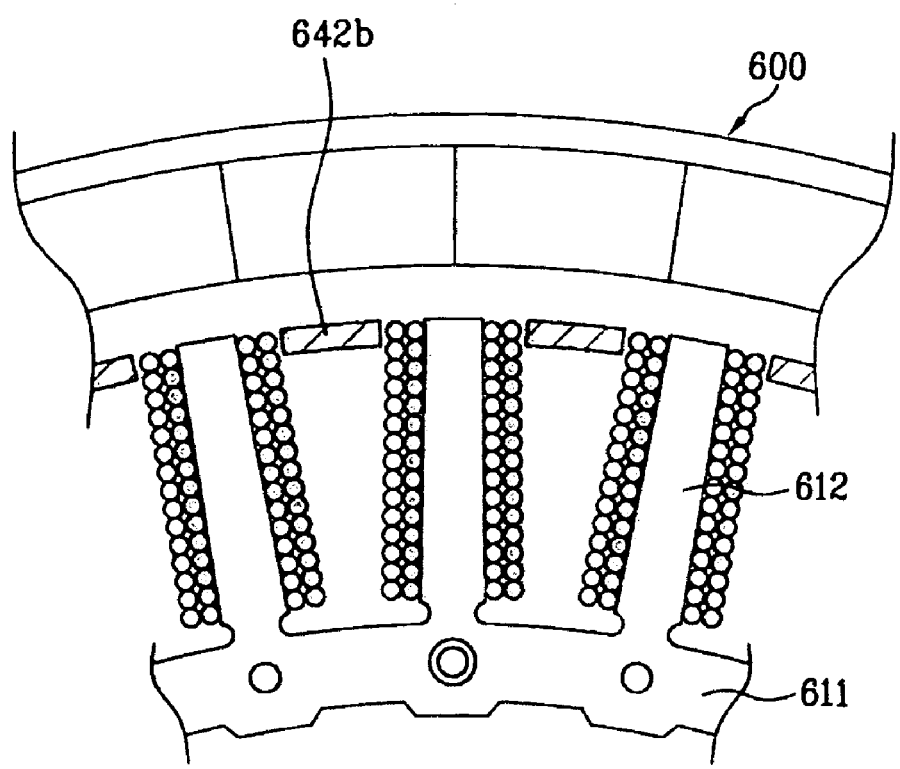
FIG. 8 is a plan view illustrating another embodiment of the stator shown in FIG. 3.
Figure 9:
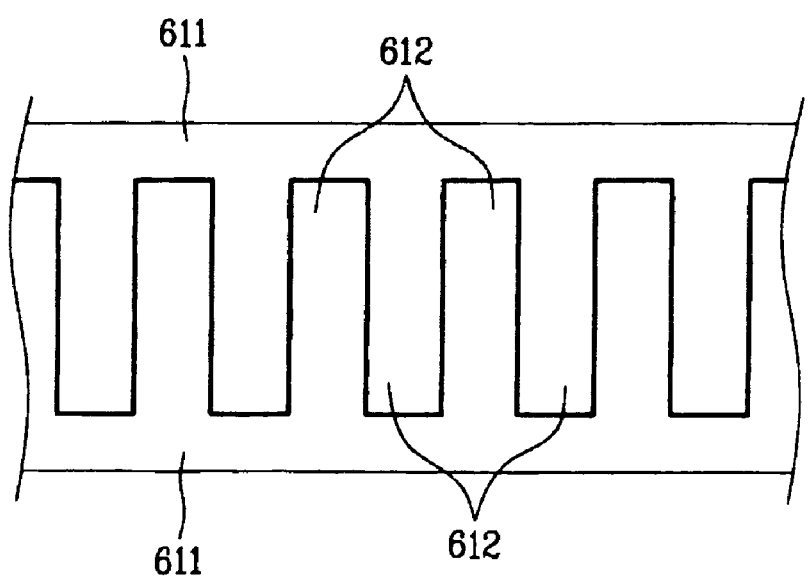
FIG. 9 is a sectional view illustrating a metal plate prepared to fabricate a main core shown in FIG. 8.

As shown in FIGS. 8 and 9, each tooth 612 of the main core 610 may have a constant width in the protrusion direction thereof. That is, since the stator 600 includes the above-described auxiliary core 640, which has vertical extensions 642b each arranged in the space S between the associated adjacent teeth 612, each tooth 612 may have a straight shape without being varied in shape at the tip thereof in order to reduce the exposed area of the associated space S.

Since each tooth 612 may have a straight shape, namely, a constant cross-section, it is possible to reduce the amount of scrap produced in the fabrication of the main core 610, and thus, to reduce the material costs of the main core 610.

Hereinafter, an auxiliary core included in the stator according to a second embodiment of the present invention will be described with reference to FIG. 10.

Figure 10:
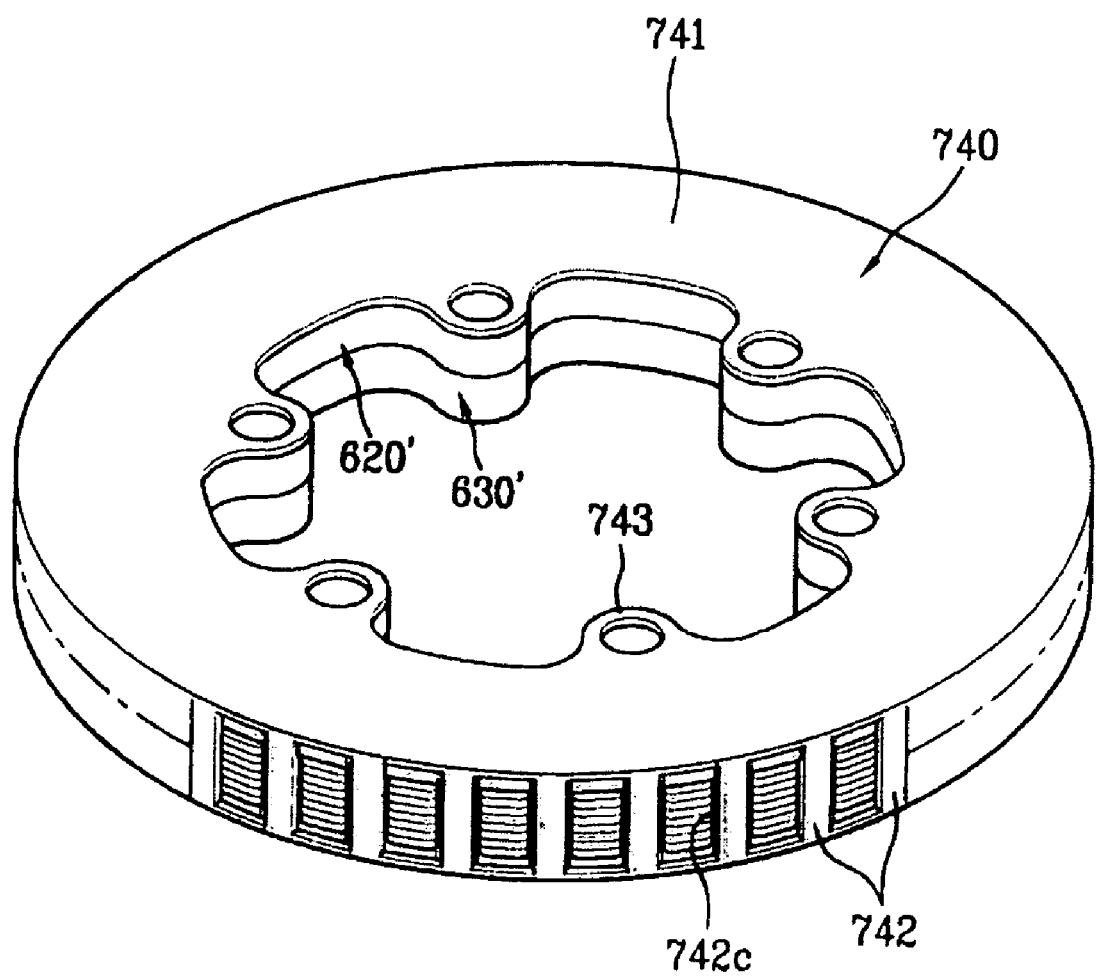
FIG. 10 is a perspective view illustrating a stator included in the motor according to a second embodiment of the present invention.

Referring to FIG. 10, an auxiliary core according to the second embodiment of the present invention is illustrated. The auxiliary core 740 includes a plate 741 seated on an upper surface of the main core 610, and shields 742 arranged along a circumferential edge of the main core 610. The plate 741 includes a fastening portion 743.

In detail, the plate 741 is formed to cover substantially the entire upper surface or the overall upper surface of the main core 610. Each shield 742 extends downwardly from the circumferential edge of the plate 741 such that it faces an outer circumferential surface of the main core 610.

Since the plate 741 is formed to cover substantially the entire upper surface or the overall upper surface of the main core 610, it covers the upper surfaces of the coils wound around the teeth of the main core 610. Accordingly, it is possible to prevent heat, which may be generated from the coils from being outwardly discharged.

Each shield 742 may be formed with a groove 742c adapted to adjust an exposed area of the space S defined between adjacent or associated teeth. Of course, each shield 742 may have a slot.

The present invention is not limited to the above-described embodiments. For example, the auxiliary core may include an upper plate positioned over the main core 610, upper shields extending from the upper plate, a lower plate positioned beneath the main core 610, and lower shields extending from the lower plate.

In this case, each upper shield may have an upper groove for adjusting an exposed area of the associated space S. Each lower shield may have a lower groove corresponding to the upper groove of the associated upper shield. The corresponding upper and lower grooves communicate with each other while extending a certain length in the stacking direction of the main core 610, so that they form a slot.

Of course, in this case, each of the upper and lower plates includes fastening portions for enabling the auxiliary core to be fastened together with the main core upon mounting the stator. The auxiliary core is made of a weak magnetic material, and is fabricated through a pressing process.

Figure 11:
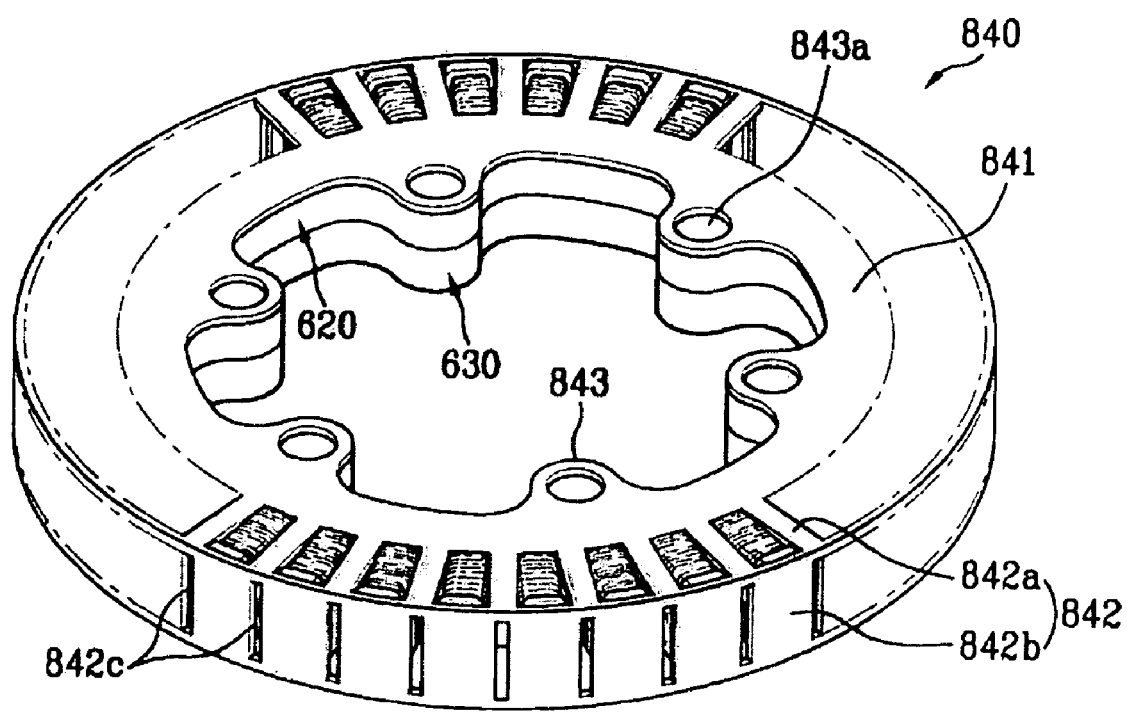
FIG. 11 is a perspective view illustrating a stator included in the motor according to third embodiment of the present invention.
Figure 12:
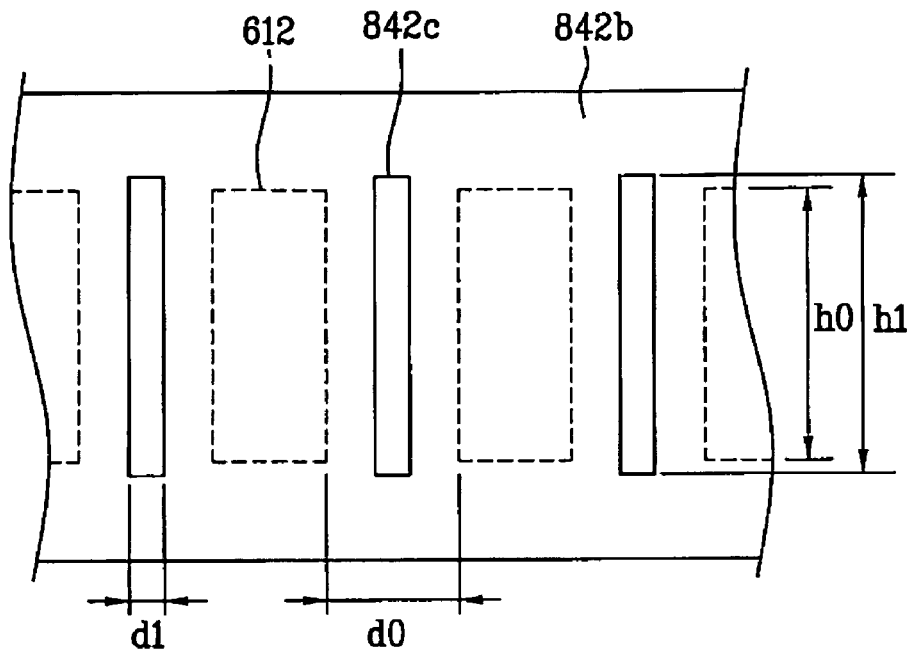
FIG. 12 is a sectional view illustrating an embodiment of a circumferential structure of the stator shown in FIG. 11.

A motor according to another embodiment of the present invention will now be described with reference to FIGS. 11 and 12.

The motor according to this embodiment has a configuration substantially similar to that of the above-described motor, except for the structure of the auxiliary core. In accordance with this embodiment, each shield 842 extending from a plate 841 in the auxiliary core 840 has a slot 842c for adjusting an exposed area of the space defined between the associated teeth. Also, the vertical extensions 842b of the shields 842 are connected together such that they form an integrated ring-shaped structure surrounding the circumferential surface of the main core. The plate 841 includes fastening portions 843 having fastening holes 843a.

In this case, a plurality of slots 842c are formed through the integrated ring-shaped structure such that they extend to a certain length in the stacking direction of the main core. Each slot 842c is positioned between the associated teeth 612. The center line of each slot 842c is aligned with the center line of the associated shield 842.

Of course, the number of holes (e.g., slots 842c) in the auxiliary core 840 may be different from the number of the teeth 612 in the main core. Furthermore, the center line of each slot 842c may be misaligned from the center line of the associated shield 642b.

The width d1 of each slot 842c is smaller than the distance d0 between adjacent teeth 612, in order to minimize the function of the space S defined between the adjacent teeth 612 as a magnetic resistance to the rotor. Each slot 842c may have a straight structure extending in the stacking direction of the main core.

Figure 13:
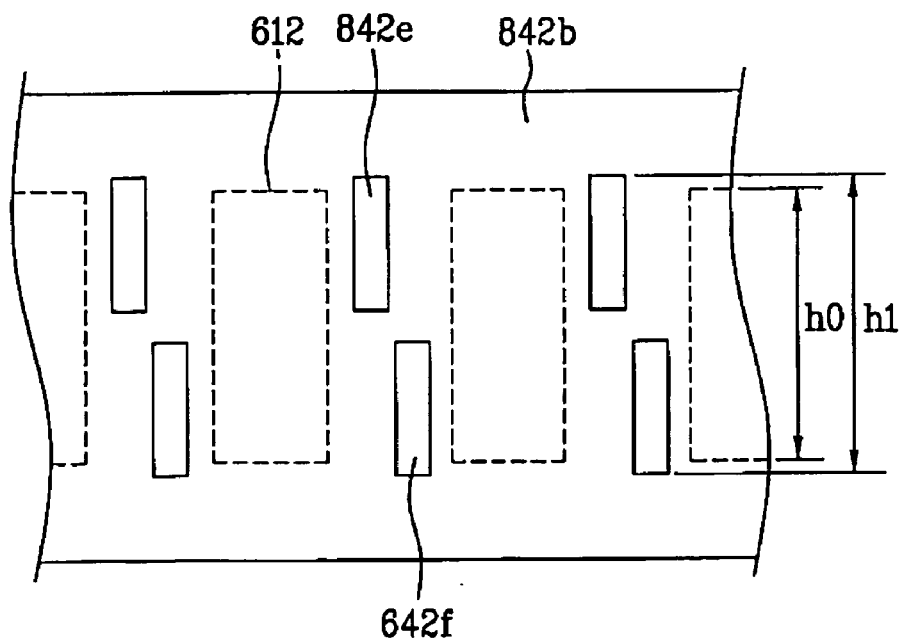
FIG. 13 is a sectional view illustrating another embodiment of the circumferential structure of the stator shown in FIG. 11.

Of course, as shown in FIG. 13, each slot 842c may be divided into an upper hole 842e and a lower hole 842f respectively arranged at opposite sides in the stacking direction of the main core.

In this case, the upper and lower holes 842e and 842f are preferably formed through the integrated ring-shaped structure of the vertical extensions 842b such that they are arranged in pairs.

Figure 14:
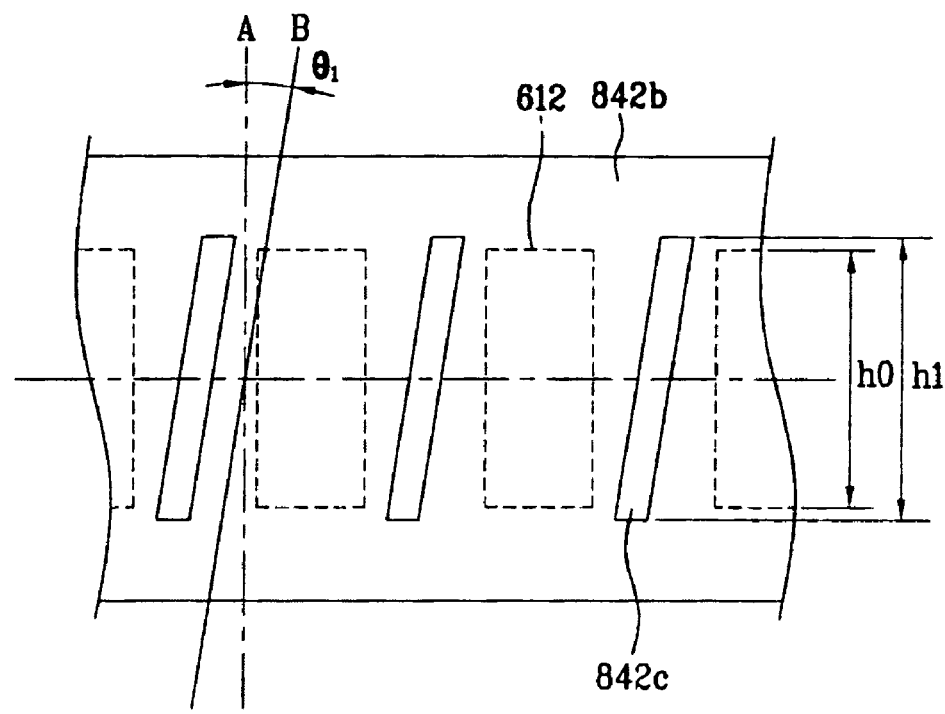
FIG. 14 is a sectional view illustrating another embodiment of the circumferential structure of the stator shown in FIG. 11.
Figure 15:
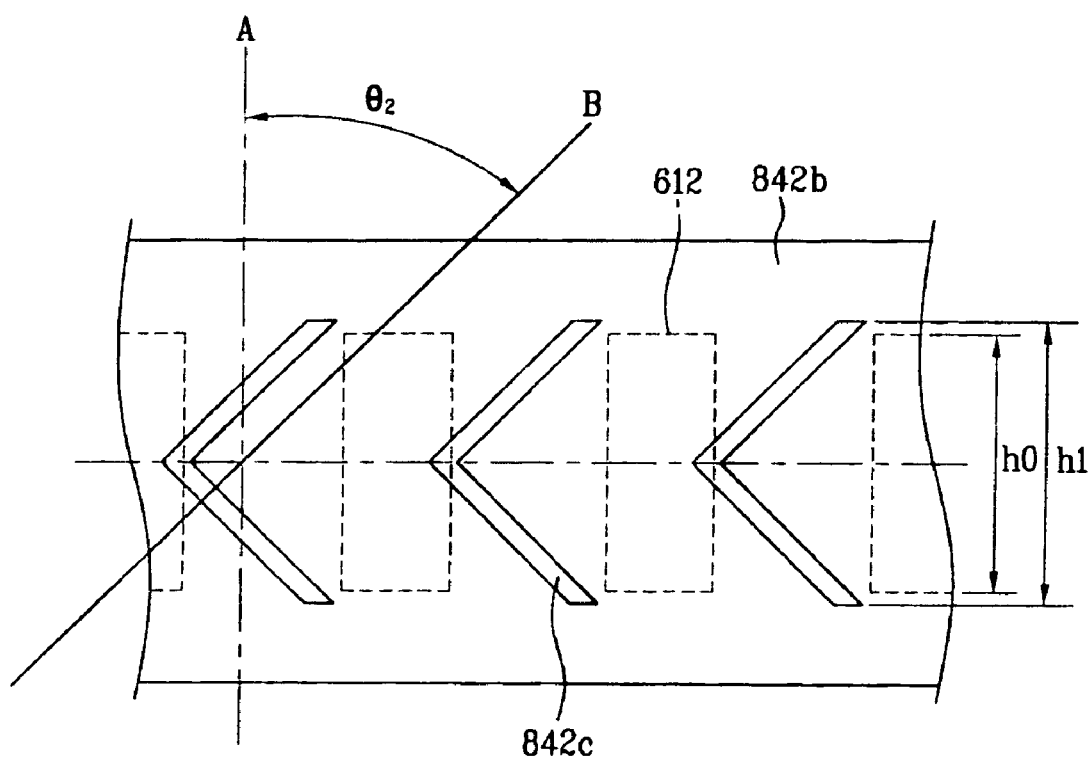
FIG. 15 is a sectional view illustrating another embodiment of the circumferential structure of the stator shown in FIG. 11.

On the other hand, as shown in FIG. 14, each slot 842c may be inclined such that a line B extending in the longitudinal direction of the slot 842c has an inclination of $\theta_1$ with respect to a line A extending in the stacking direction of the main core, while having a symmetrical structure with respect to the center of the slot 842c.

Thus, in accordance with embodiments of the present invention, the exposed area of the space between the adjacent teeth 612 in the circumferential direction of the main core can be adjusted in accordance with various shapes of the slots 842c. Accordingly, it is possible to effectively reduce the cogging torque and torque ripple of the motor.

Meanwhile, as shown in FIGS. 12 to 15, it is desirable that the length h1 of each slot 842c be larger than the stacking height $h_0$ of the main core 610, irrespective of whether or not the slot 842c varies in shape, size, and position.

Each slot may have any shape and any size without being limited to those of those embodiments. The stator may further include an intermediate member for preventing transmission of vibrations between the main and auxiliary cores, and insulating the main and auxiliary cores from each other. In detail, an intermediate member made of, for example, an elastic insulating material, is interposed between the tips of the teeth in the main core and the auxiliary core contacting the tooth tips, in order to reduce transmission of vibrations between the two objects.

In addition, another intermediate member may be interposed between the auxiliary coupling portions of the auxiliary core and the coupling portions of the insulator contacting the auxiliary core, in order to prevent transmission of vibrations between the auxiliary core and the insulator, and to insulate the auxiliary core and the insulator. Preferably, the intermediate member is made of a material having elasticity and non-conductivity, such as rubber or a plastic material.

Hereinafter, a procedure for manufacturing the stator included in the motor will be described with reference to FIGS. 3 and 4.

In order to manufacture the stator, the main core 610, upper insulator 620, lower insulator 630, and auxiliary core 640 are first separately fabricated.

In order to fabricate the main core 610, a metal plate is pressed to prepare an elongated metal strip having a base to form the base 611 of the main core 610, and teeth to form the teeth 612 of the main core 610. The prepared metal strip is then spirally wound such that the wound portions thereof are stacked, to form an annular structure. Thus, the fabrication of the main core 610 is completed.

Thereafter, the upper and lower insulators 620 and 630 are coupled to the main core 610. Coils are wound around the teeth 612 of the main core 610 under the condition in which the upper and lower insulators 620 and 630 have been coupled to the main core 610, form the coils 650.

The auxiliary core 640 is subsequently coupled to the main core 610 on which the coils 650 have been wound. Thus, the fabrication of the stator is completed. When the auxiliary core 640 is coupled to the main core 610, it is desirable to arrange the auxiliary core 640 such that at least a portion of the space defined between the adjacent teeth 612 is shielded by the associated shield 642 of the auxiliary core 640.

Although the main core is fabricated using a method of spirally winding a metal strip with a base and a plurality of teeth such that the wound portions thereof are stacked, in the above-described case, the present invention is not limited to this method. For example, the main core may be fabricated by preparing a plurality of divided cores each consisting of stacked metal plates each having a base and a plurality of teeth, and coupling the prepared divided cores to one another in a circumferential direction.

It will be appreciated that the motor having the above-described structure is usable in various machinery such as washing machines, refrigerators, and other appliances. An example of a motor applied to a washing machine will be described hereinafter.

The washing machine includes a cabinet having an opening, through which laundry is put into or taken out of the cabinet, a tub installed within the cabinet, a washing tub rotatably arranged in the tub, and a door for opening or closing the opening. The washing machine further includes a motor for rotating the washing tub, and a rotating shaft for transmitting a drive force from the motor to the washing tub.

The motor includes a stator and a rotor. The stator includes a base, a main core having a plurality of teeth protruded from the base, and an auxiliary core for reducing a magnetic resistance generated due to a space defined between the adjacent teeth. No detailed description of the auxiliary core will be given because it is similar to the above description.

It will be apparent to those skilled in the art that various modifications and variations can be made without departing from the spirit or scope of the present invention. Thus, it is intended that the present invention covers the modifications and variations that come within the scope of the appended claims and their equivalents.

The embodiments of the present invention as described above has the following effects.

First, there is an advantage in that it is possible to reduce generation of a magnetic resistance between the stator and the rotor by virtue of the auxiliary core adapted to adjust the exposed area of the space defined between the adjacent teeth of the main core.

Accordingly, the motor, which is equipped with the auxiliary core in accordance with embodiments of the present invention, is effective and configured to achieve a reduction in cogging torque and torque ripple, so that the effective torque of the motor is increased. Thus, an enhancement in performance is achieved.

Second, there is an advantage in that it is possible to freely control the magnitude of an electromagnetic excitation force generated between the stator and the rotor and the rotating frequency of the motor in accordance with the slots formed at the auxiliary core, the width or pitch of the slots, or the number of slots.

Therefore, it is possible to reduce electromagnetic vibrations generated between the stator and the rotor, and noise caused by the electromagnetic vibrations, and thus, to achieve further enhancement in the performance of the motor.

Third, since the shields each arranged between the adjacent teeth of the main core can have a constant width in accordance with the embodiments of the present invention, it is possible to reduce the generation of scrap in the manufacture of the main core, and thus, to reduce the material costs.

Fourth, since the main core of the embodiments of the present invention can be fabricated by spirally winding a metal plate such that the wound portions thereof are stacked in accordance with the embodiments of the present invention, there is an advantage in that it is possible to easily achieve the manufacture of the main core, inexpensively.

What is claimed is:

1. A motor comprising:
    a stator; and
    a rotor surrounding the stator and rotating by interaction with the stator, wherein the stator comprises:
        a main core including a base, and a plurality of teeth protruding from the base and having a coil wound thereon; and
        an auxiliary core structured to prevent spaces between adjacent teeth from functioning as a magnetic resistance while the stator co-operates with the rotor, wherein the auxiliary core comprises:
            a plate positioned over or beneath the main core, and
            a shield arranged at and associated with each of the spaces formed between the teeth, wherein each shield comprises:
                a first extension extending from the plate, and
                a second extension extending from the first extension such that the second extension is bent from the first extension to shield the associated space,
            wherein the second extension is arranged outside a circumferential surface of the main core, and has a height larger than a thickness of the main core,
            wherein a plurality of second extensions are connected together, to form an integrated ring-shaped structure surrounding the circumferential surface of the main core, and
            wherein the integrated ring-shaped structure has a plurality of slots structured to adjust a size of an exposed area of the spaces.

2. The motor according to claim 1, wherein the plate covers an overall upper surface of the main core.

3. The motor according to claim 1, wherein each second extension has a groove configured to adjust a size of an exposed area of the associated space.

4. The motor according to claim 1, wherein the second extension has a portion varying in width along a thickness direction of the main core.

5. The motor according to claim 1, wherein each tooth has a portion varying a width in a protrusion direction of the tooth.

6. The motor according to claim 1, wherein each slot is arranged between adjacent teeth.

7. The motor according to claim 1, further comprising:
    an insulator interposed between a coil wound around each tooth and the main core or between the coils respectively wound around the teeth.

8. The motor according to claim 1, wherein the auxiliary core is fabricated in accordance with a pressing process.

9. The motor according to claim 1, wherein the auxiliary core comprises a weak magnetic material.

10. The motor according to claim 1, further comprising:
    an intermediate member structured to prevent transmission of vibrations between the auxiliary core and the main core, and insulate the auxiliary core and the main core from each other.

11. The motor according to claim 1, wherein the main core has a structure having a plurality of layers spirally stacked in a thickness direction of the main core.

* * * * *